United States Patent [19]
Rink

[11] Patent Number: 5,195,222
[45] Date of Patent: Mar. 23, 1993

[54] FASTENING BETWEEN AN UPHOLSTERY COVER AND A SUPPORT RECEIVING THE UPHOLSTERY

[75] Inventor: Manfred Rink, Cologne, Fed. Rep. of Germany

[73] Assignee: Bayer Aktiengesellschaft, Leverkusen, Fed. Rep. of Germany

[21] Appl. No.: 443,778

[22] Filed: Nov. 30, 1989

[30] Foreign Application Priority Data

Dec. 9, 1988 [DE] Fed. Rep. of Germany ....... 3841531

[51] Int. Cl.⁵ ............................................. A47C 31/02
[52] U.S. Cl. ............................................ 24/587; 5/403
[58] Field of Search ........................ 297/218, 219, 229; 5/402-404; 160/381, 395; 24/576, 577, 587, 599, 614-616

[56] References Cited

U.S. PATENT DOCUMENTS

| | | | |
|---|---|---|---|
| 1,221,748 | 4/1917 | Kohler | 5/404 X |
| 3,216,029 | 11/1965 | Fritzmeier | 5/403 |
| 3,269,145 | 8/1966 | Druskin | 24/616 X |
| 3,981,534 | 9/1976 | Wilton | 5/402 X |
| 4,745,667 | 5/1988 | Conte | 24/615 |
| 4,777,072 | 10/1988 | Cason, Jr. | 24/587 X |

FOREIGN PATENT DOCUMENTS

| | | |
|---|---|---|
| 3618057 | 12/1986 | Fed. Rep. of Germany . |
| 2481907 | 11/1981 | France . |
| 969236 | 9/1964 | United Kingdom .......... 24/587 |
| 1428507 | 3/1976 | United Kingdom . |

Primary Examiner—James R. Brittain
Attorney, Agent, or Firm—Joseph C. Gil

[57] ABSTRACT

A fastening connection between a cushion covering and a support for the cushion is disclosed. The support may be molded from a thermoplastic resin by injection. The connection comprise a hook profile strip which snaps into position fastening the edge of the cushion cover to the support. The support is characterized in that it has a U-shaped edge having recesses and projections for engaging with the hook profile strip.

1 Claim, 1 Drawing Sheet

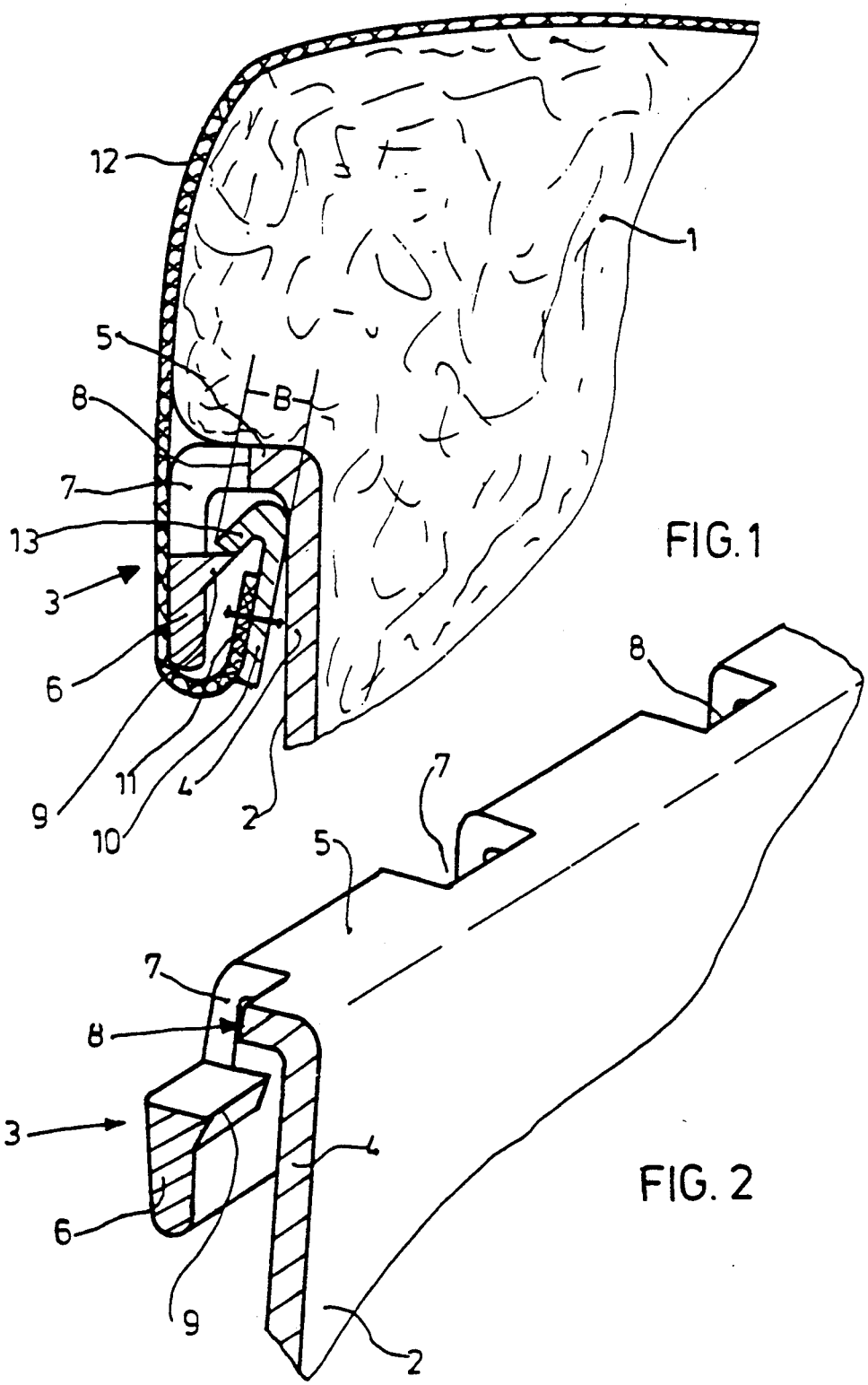

FASTENING BETWEEN AN UPHOLSTERY COVER AND A SUPPORT RECEIVING THE UPHOLSTERY

FIELD OF THE INVENTION

The invention relates to a fastening connection between an upholstery cover and a support receiving the upholstery.

BACKGROUND OF THE INVENTION

In the case of upholstery for heavy-duty seat furniture, and in particular for vehicle seats, the difficulty exists in providing an easily released fastening for the cover which would permit replacement of the cover or of the upholstery and in particular permit the reuse of the cover. Particularly in the case of vehicle seats, today's trend is towards providing foam behind the seat covers during the actual manufacture of the upholstery so that a non-releasable connection is formed. On the other hand, vehicle seats are designed in such a way that upholstery can scarcely be released any more from its supports, if at all not without greater expenditure of energy. Often the replacement of a whole seat base or a seat back is necessary if the upholstery is worn through or the cover is worn out. A replaceable cover would make today's conventional protective covers superfluous and would ease replacing the upholstery.

In FR-PS-2,481,907 there is disclosed a seat support made of plastic material. The support has a U-shaped edge having recesses in which symmetrically arranged clamp projection are provided which hold between them the edge of a covering stretched over a profile. This clamp connection, depending on design, can not be undone at all or only with tools, which operations could lead to damage.

In DE-OS 2,340,831 there is disclosed a covering for a chair and a hooked strip which engages at a projection of the support. The hooked strip is secured by placing it against a profile of the support. This connection is difficult to undo. In other embodiments the connections can be undone but it is not sufficiently secured and may become undone by itself.

SUMMARY OF THE INVENTION

The invention relates to a fastening connection between a cushion covering and a support for the cushion. The support may be molded from a thermoplastic resin by injection. The connection comprise a hook profile strip which snaps into position fastening the edge of said cushion to the support. Said support being characterized in that it has a U-shaped edge having recesses and projections.

BRIEF DESCRIPTION OF THE DRAWINGS

FIG. 1 shows a section through the fastening and
FIG. 2 shows the edge of the support for the upholstery in spatial representation.

DETAILED DESCRIPTION OF THE INVENTION

The object of the invention is to provide a fastening of the type mentioned in the introduction - in particular for upholstery covers of vehicle seats - which can be easily released and re-formed, to enable replacing the upholstery cover or upholstery in a simple manner without particular manual dexterity.

This object is achieved by arranging an elastically flexible hook profile strip at the edge of the upholstery cover, and by using a support having a U-shaped edge, wherein one limb of said U-shaped edge, has a plurality of recesses extending into central web of said edge and a plurality of projections extending in the direction of the second limb of said edge is arranged in the region of said recess, the hook of said strip engages these projections. The recesses extend from said one limb of the U-shaped edge into the center web of said edge at least as far as the projections reach in the area of these recesses in the same direction. The profile comprise a hooked profile strip whose hook is engaged in the projections.

This makes it possible for the cover and/or the upholstery to be easily replaced.

The support comprises, for example a frame or a bowl made from sheet metal or plastic. The hook profile strip may be molded from a suitable thermoplastic resin for example polypropylene, polyethylene or another plastic resin with similar elastic properties. The hook profile strip should be elastic so that it can adapt to the geometry of the support; yet it must have sufficient rigidity and not be deformed to a large extent. Naturally when the hook profile strip is engaged, the cover must be stretched such that the fastening is not released when the seat is under load. This does not present any problems because it is highly likely that upholstery covers are stretched so tightly that they rest on the upholstery firmly and without folds.

The support is preferably an injection molded plastic resin, preferably a glass reinforced polyamide-6, and the recesses in the one limb of said U-shaped edge extend at least as far into the central web of the U-shaped edge as the projections in the direction of the second limb.

The fastening can be manufactured at very reasonable cost, because the mold does not require a slide to manufacture the support. That is to say, in the region between central web and projection, the contours of the two mold halves can touch vertically.

According to a further particular embodiment of the novel fastening, the distance of the projections from the second limb is shorter than the width (B) of the hook profile strip. This ensures avoidance of unintentional release of the connection.

The hook profile strip can thus be snapped onto the projections and cannot be released by itself. As the upholstery cover at least yields when the upholstery is compressed, the hook can be pressed through the recesses in the direction of the other limb to release the upholstery cover, whereupon the hook slides away from the projections so that the hook profile strip can be pulled out from the gap between projections and the second limb.

In the drawing the novel fastening is shown purely schematically using the example of vehicle seat upholstery.

Upholstery 1 is arranged in a bowl-shaped support 2 of which essentially only the edge 3 is shown. The support 2 consists of a plastic injection molding made from polyamide-6 having 30 wt. % glass fiber content Its edge 3 passes from an inner limb 4 via a central web 5 in a U-shape into an outer limb 6. The edge 3 has recesses 7 at regular distances which, on the one hand, extend to the center 8 of the central web 5, and, on the other hand, end at the outer limb 6 at the level of projections 9. The projections 9 extend in the direction of the limb 4 in the region of these recesses 7 A flexible hook profile strip 10 made from polyethylene is engaged at the projections 9 around the periphery, of the support 2 and the edge 11 of an upholstery cover 12 is attached to this hook profile strip 10 by sewing. The hooks 13 rest on the projections 9. The width B of the hook profile strip 10 is slightly less than the distance of the projections 9 from the limb 4 so that the hook 13 of the hook profile strip 10 cannot by itself slide off the projections 9. Obviously the size of the upholstery cover 12 is such that it covers the upholstery 1 tightly.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A fastening connection between a cover for an upholstery and a support for said upholstery wherein said support is made by injection molding from a thermoplastic molding composition said connection comprising
    (1) an elastic strip attached to an edge of said cover, said strip having a hook shaped profile, and
    (2) a U-shaped edge of said support, said U-shaped edge having a central web, an inner limb and an outer limb, wherein said outer limb of said U-shaped edge includes a plurality of recesses and a plurality of projections, said projections extending towards said inner limb, said hook engaging said projections, said recesses extending into said central web at least as far as said projections extend towards said inner limb.

* * * * *